United States Patent
Jaradi et al.

(10) Patent No.: US 11,554,739 B1
(45) Date of Patent: Jan. 17, 2023

(54) VEHICLE MIDDLE CONSOLE ASSEMBLY INCLUDING AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/472,995

(22) Filed: Sep. 13, 2021

(51) Int. Cl.
  *B60R 21/20* (2011.01)
  *B60R 21/015* (2006.01)
  *B60R 21/0136* (2006.01)

(52) U.S. Cl.
  CPC .......... *B60R 21/20* (2013.01); *B60R 21/0136* (2013.01); *B60R 21/01512* (2014.10)

(58) Field of Classification Search
  CPC ............ B60R 2021/23153; B60R 2021/23161
  See application file for complete search history.

(56) References Cited

U.S. PATENT DOCUMENTS

| | | | |
|---|---|---|---|
| 7,594,675 B2 * | 9/2009 | Bostrom | B60R 21/207 280/730.2 |
| 8,210,566 B2 | 7/2012 | Fukawatase et al. | |
| 9,688,232 B1 | 6/2017 | Loew | |
| 10,131,312 B2 * | 11/2018 | Wiik | B60R 21/2338 |
| 10,543,802 B1 | 1/2020 | Makowski et al. | |
| 11,007,961 B2 * | 5/2021 | Deng | B60R 21/055 |
| 11,433,848 B1 * | 9/2022 | Faruque | B60R 21/215 |
| 2005/0062264 A1 | 3/2005 | Arwood et al. | |
| 2008/0129024 A1 | 6/2008 | Suzuki et al. | |
| 2010/0264629 A1 | 10/2010 | Gandhi | |
| 2011/0278826 A1 * | 11/2011 | Fukawatase | B60R 21/231 280/730.2 |
| 2018/0126941 A1 * | 5/2018 | Faruque | B60R 21/237 |
| 2018/0201211 A1 | 7/2018 | Gandhi et al. | |
| 2020/0317155 A1 * | 10/2020 | Deng | B60R 21/23138 |

FOREIGN PATENT DOCUMENTS

| | | | | |
|---|---|---|---|---|
| CN | 111152748 A | * | 5/2020 | ............ B60R 21/20 |
| CN | 111806381 A | * | 10/2020 | ............ B60R 21/20 |
| DE | 102010016716 A1 | * | 5/2011 | ............ B60R 21/20 |
| DE | 102018002853 A1 | * | 10/2018 | |
| DE | 102018220078 A1 | * | 5/2020 | |
| DE | 102021107868 A1 | * | 9/2021 | .......... B60R 21/207 |
| EP | 3461695 A1 | * | 4/2019 | ............ B60R 21/20 |
| EP | 3696029 A1 | | 8/2020 | |
| WO | WO-03068556 A1 | * | 8/2003 | .......... B60N 2/2851 |
| WO | WO-2010050015 A1 | * | 5/2010 | .......... B60R 21/231 |

* cited by examiner

Primary Examiner — Nicole T Verley
(74) Attorney, Agent, or Firm — Frank A. MacKenzie; Bejin Bieneman PLC (57) ABSTRACT

A middle console assembly includes a middle console including a vehicle-rearward side. The middle console assembly includes an airbag assembly including a base and an airbag supported by the base. The base of the airbag assembly is disposed at and moveable upwardly relative to the vehicle-rearward side of the middle console.

18 Claims, 9 Drawing Sheets

VEHICLE MIDDLE CONSOLE ASSEMBLY INCLUDING AIRBAG

BACKGROUND

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc. In some examples, the vehicle may include a middle console assembly in the middle of two seats and the middle console assembly may include an airbag assembly that inflates from the middle console assembly.

DETAILED DESCRIPTION

A middle console assembly includes a middle console including a vehicle-rearward side and an airbag assembly including a base and an airbag supported by the base. The base of the airbag assembly is disposed at and moveable upwardly relative to the vehicle-rearward side of the middle console.

The middle console assembly may include an armrest, the airbag assembly being vehicle-rearward of the armrest.

The middle console assembly may include an upward track moveably coupling the base of the airbag assembly to the middle console.

The airbag may be inflatable in a vehicle-forward direction from the base.

The airbag may be inflatable in a vehicle-rearward direction from the base. The airbag may be elongated in a cross-vehicle direction. The middle console assembly may include a second airbag inflatable in a vehicle-forward direction from the base.

The base of airbag may be moveable vehicle-rearward relative to the vehicle-rearward side of the middle console. The middle console assembly may include a rearward track moveably coupling the base of the airbag assembly to the middle console. The middle console assembly may include a linear actuator between the middle console and the base of the airbag assembly and operatively coupled to the base of the airbag assembly to move the base of the airbag assembly vehicle-rearward and vehicle-forward relative to the middle console. The base may include first carrier that is moveable vehicle-rearward relative to vehicle-rearward side of the middle console and a second carrier that is supported by and moveable upwardly relative to first carrier. The middle console assembly may include a rearward track moveably coupling the first carrier to the middle console and an upward track moveably coupling the second carrier to the first carrier. The airbag may be inflatable in a vehicle-forward direction from the base. The airbag may be inflatable in a vehicle-rearward direction from the base. The airbag may be elongated in a cross-vehicle direction. The middle console assembly may include a second airbag inflatable in a vehicle-forward direction from the base.

The base may be moveable relative to the middle console between a retracted position retracted in the middle console and an extended position extended from the middle console.

The middle console assembly may include a pyrotechnic actuator coupled to the base of the airbag assembly.

Figure 5:
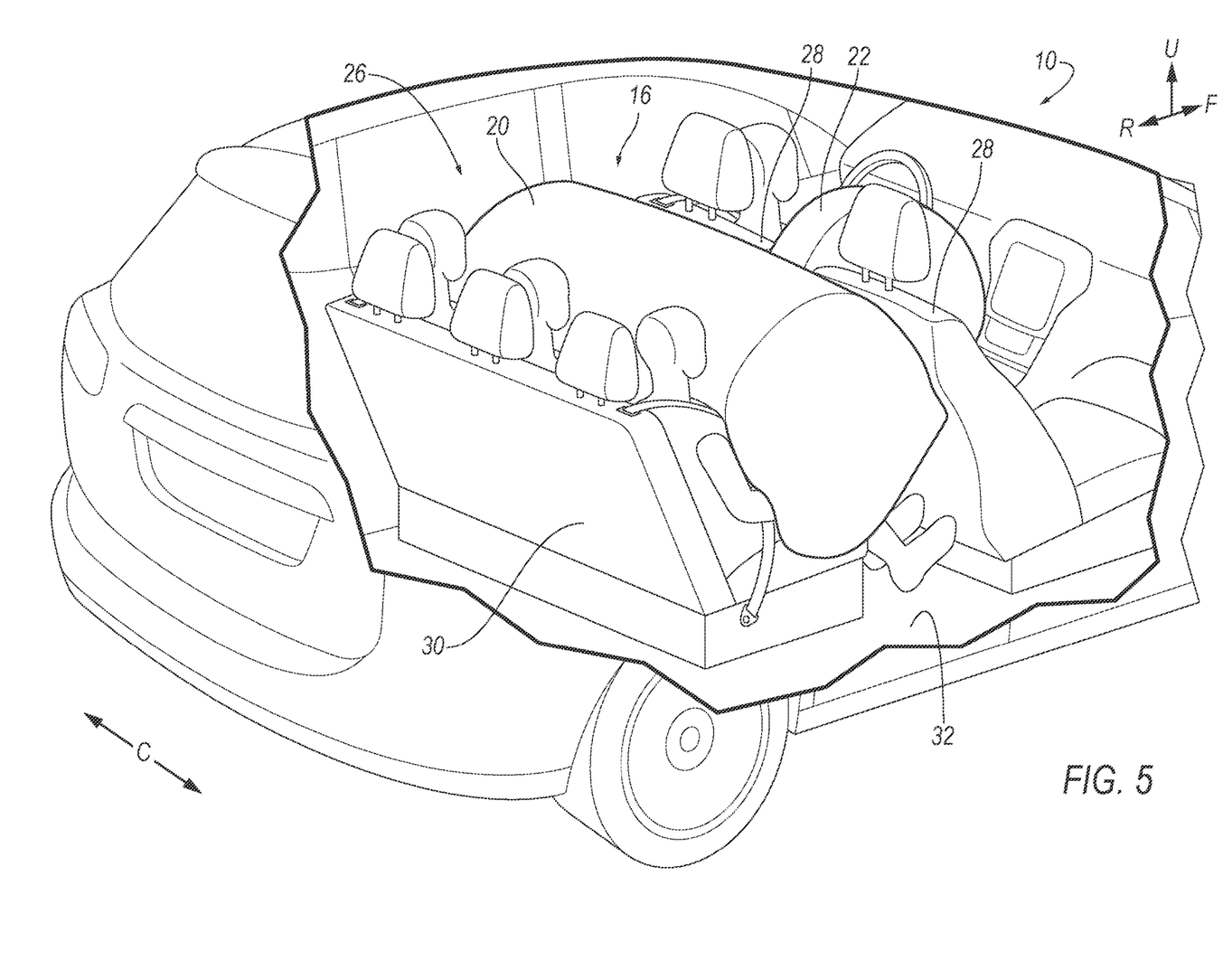
FIG. 5 is a cut-away view of the vehicle with the two airbags inflated.

With reference to the Figures, wherein like numerals indicate like parts throughout the several views, a middle console assembly 12 for a vehicle 10 includes a middle console 14 including a vehicle-rearward side 24. The middle console assembly 12 includes an airbag assembly 16 including a base 18 and an airbag 20 supported by the base 18. The base 18 of the airbag assembly 16 is disposed at and moveable upwardly (identified with U in FIGS. 1 and 5) relative to the vehicle-rearward side 24 of the middle console 14.

The movement of the base 18 of the airbag assembly 16 upwardly relative to the vehicle-rearward side 24 of the middle console 14 positions the airbag assembly 16 relative to the occupants of the vehicle 10 to control kinematics of the occupants. Specifically, in response to a detected vehicle impact, the base 18 is moved upwardly relative to the vehicle-rearward side 24 of the middle console 14 to vertically position the airbag 20 and the airbag 20 is inflated. Thus, the airbag 20 may be packaged at the vehicle-rearward side 24 of the middle console 14 in a lowered position relative to the middle console 14 in the absence of vehicle impact and may be moved upwardly relative to the vehicle-rearward side 24 of the middle console 14 for desired placement in response to a detected vehicle impact.

In some examples, the airbag assembly 16 includes two airbags 20, 22 supported on the base 18 of the airbag assembly 16, specifically, a first airbag 20 inflatable vehicle-forward from the base 18 of the airbag assembly 16 and a second airbag 22 inflatable vehicle-rearward from the base 18 of the airbag assembly 16. In such an example, the first airbag 20 may control the kinematics of occupants seated forward of the airbag assembly 16 and the second airbag 22 may control the kinematics of occupants seated rearward of the airbag assembly 16 in response to a detected vehicle impact. Both the first airbag 20 and the second airbag 22 are packaged at the vehicle-rearward side 24 of the middle console 14 in a lowered position relative to the middle console 14 in the absence of vehicle impact and the first airbag 20 and second airbag 22 are moved upwardly relative to the vehicle-rearward side 24 of the middle console 14 to be positioned to control the kinematics of forward occupants and rearward occupants, respectively.

Two examples of the middle console assembly 12 are shown in the Figures. Specifically, one example, is shown in FIGS. 1-4 and another example is shown in FIGS. 5-8. Common numerals identify common features in the examples in FIGS. 1-4 and FIGS. 5-8. In the example shown in FIGS. 1-4, the base 18 of the airbag assembly 16 is moveably upwardly relative to the vehicle-rearward side 24 of the middle console 14. In some examples, including the example shown in FIGS. 5-8, the base 18 of the airbag assembly 16 is moveable vehicle-rearward (identified with F in FIGS. 1 and 5) from relative to the vehicle-rearward side 24 of the middle console 14. This position of the airbag assembly 16 in vehicle-fore-and-aft position to control the kinematics of the occupants. In such an example, the movement of the base 18 of the airbag 20 may be independent of detected vehicle impact. For example, the base 18 of the airbag assembly 16 may be moved vehicle 10 rearward when occupants are seated in the vehicle 10 in the absence of a detected vehicle impact to pre-position the airbag 20 vehicle-fore-and-aft. In the event the occupants in the vehicle 10 are going to exit the vehicle 10 after operation of the vehicle 10, the base 18 of the airbag assembly 16 may be moved vehicle-forward (identified with F in FIGS. 1 and 5) to increase space in which the occupant can move during egress and again during occupant ingress.

The vehicle 10 may be any suitable type of ground vehicle 10, e.g., a passenger or commercial automobile such as a sedan, a coupe, a truck, a sport utility, a crossover, a van, a minivan, a taxi, a bus, etc. The vehicle 10 includes a vehicle body (not numbered). The vehicle body defines a passenger cabin 26 to house occupants, if any, of the vehicle 10. The vehicle body includes a floor 32. The floor 32 defines the lower boundary of the passenger cabin 26. The floor 32 may, for example, include a metal pan and may be covered by upholstery, e.g., carpeting, facing the passenger cabin 26.

The vehicle 10 includes seats 28, 30 in the passenger cabin 26. The seats 28, 30 may be arranged in the passenger cabin 26 in any suitable position, e.g., in rows such as a front row, second row behind the front row, a third row behind the second row, etc. In the example shown in FIG. 1, the seats 28, 30 are arranged in a front row and a rear row. Specifically, in such an example, the vehicle 10 includes two front seats 28 and rear seats 30. The front seats 28 are spaced each other cross-vehicle with the middle console 14 disposed therebetween. The front seats 28, specifically, may be a driver seat and a passenger seat, respectively. The front seats 28 may be bucket seats, as shown in the Figures, or may be of any suitable configuration.

The rear seat 30 is vehicle-rearward of the front seats 28 and the middle console 14. The rear seat 30 may be, for example, a bench seat as shown in the Figures. In such an example, the rear seat 30 includes an occupant seating area and seatbelt for each of a plurality of occupants, e.g., three occupants in the example shown in the Figures. As another example, the vehicle 10 may include a plurality of rear seats 30 arranged cross-vehicle, e.g., bucket seats, captain chairs, etc.

The middle console assembly 12 is in the middle of two seats, i.e., is between two seats. The middle console assembly 12 may be on a longitudinal midline of the vehicle 10 in a cross-vehicle, as shown in the Figures. In other examples, the middle console assembly 12 may be in the middle of two adjacent seats and offset from the longitudinal midline of the vehicle 10.

The middle console assembly 12 includes the middle console 14. The middle console 14 may be supported by the floor 32. Specifically, in such examples, the middle console 14 extends upwardly from the floor 32 between the first seat and the second seat. In such an example, the middle console 14 abuts the floor 32 and may be connected to the floor 32, e.g., with fasteners such as threaded fasteners. As another example, the middle console 14 may be supported by one of the seats. The middle console 14 may be, for example, plastic such as acrylonitrile butadiene styrene (ABS), vinyl, etc. The middle console 14 may include a class-A surface exposed to the passenger cabin 26. A class-A surface is a finished surface free of unaesthetic blemishes and defects and exposed to view by a vehicle 10 occupant seated in the vehicle 10. The middle console 14 may include cup holders and may support vehicle 10 controls, e.g., a gear shifter, window controls, HVAC controls, multimedia controls, etc.

The middle console assembly 12 may include an armrest 34. The armrest 34 is above the middle console 14 and, for example, may be supported by the middle console 14. The armrest 34 is designed to support the arm of occupants of the vehicle 10 seated in the front seats 28. Specifically, the armrest 34 is sized, shaped, and positioned to support the arm of the occupant. The armrest 34 may be upholstered, e.g., with a covering of vinyl, leather, etc.

The middle console assembly 12, specifically the middle console 14, may include a storage compartment (not numbered) below the armrest 34. In such an example, the armrest 34 is moveably attached to the middle console 14. The storage compartment may be designed to store items, e.g., personal items belonging to a vehicle 10 occupant. The armrest 34 may be selectively moveable relative to the middle console 14 to cover and uncover the storage compartment, i.e., the armrest 34 is a lid of the storage compartment to allow access to the storage compartment. As an example, the armrest 34 may be rotatable relative to the storage compartment. In such an example, a hinge rotatably connects the armrest 34 to the middle console 14. Specifically, the armrest 34 may be rotatable upwardly from the storage compartment about the hinge between a closed position and an open position.

The middle console 14 including a vehicle-forward side 36 and a vehicle-rearward side 24. The vehicle-forward side 36 is vehicle-forward of the vehicle-rearward side 24. The vehicle-forward side 36 faces vehicle-forward and the vehicle-rearward side 24 faces vehicle 10 rearward. The middle console 14 may include two lateral sides 38 spaced from each other and each extending from the vehicle-forward side 36 to the vehicle-rearward side 24. The middle console 14 may be elongated from the vehicle-forward side 36 to the vehicle-rearward side 24. As an example, the middle console 14 may be rectangular in a horizontal cross-section.

The airbag assembly 16 includes the base 18, the airbag 20, 22 supported by the base 18, and an inflator 40. Specifically, in the example shown in the Figures, the airbag assembly 16 may include a first airbag 20 and a second airbag 22. The adjectives "first" and "second" are identifiers and do not signify order or importance. In other examples, the airbag assembly 16 may include one airbag or more than two airbags. The inflator 40 inflates the airbag 20, 22 to the inflated position, as described further below. In examples including more than one airbag 20, the inflator 40 may inflate more than one or all of the airbags 20, 22 or the airbag assembly 16 may include more than one inflator 40.

The airbag 20, 22 may inflate from the base 18 vehicle-rearward and/or vehicle-forward. In the example shown in the Figures, the first airbag 20 is inflatable in a vehicle-rearward direction from the base 18 and the second airbag 22 is inflatable in a vehicle-forward direction from the base 18. In such an example, the first airbag 20 is disposed between the front seats 28 and rear seats 30 to control the kinematics of the occupants of the rear seats 30, e.g., during vehicle frontal impact, and the second airbag 22 is disposed between the front seats 28 of the vehicle 10 to control the kinematics of the occupants of the front seat 28, e.g., during vehicle side impact. In such an example, the first airbag 20 may be elongated in a cross-vehicle direction C. Specifically, the first airbag 20 may be vehicle-forward of three rear seats 30, i.e., elongated in the cross-vehicle direction C to be vehicle-forward of the three rear seats 30. In that example, the first airbag 20 controls the kinematics of occupants seated in any of the three rear seats 30.

The airbag (e.g., both the first airbag 20 and the second airbag 22) is supported by the base 18 in an uninflated position and in an inflated position. The airbag 20, 22 moves with base 18, e.g., as the base 18 moves relative to the middle console 14. The base 18 may be, for example, an airbag housing. In such an example, the base 18, i.e., the airbag housing, houses the airbag 20 in the uninflated position and supports the airbag 20 in the inflated position. In examples including the first airbag 20 and the second airbag 22, both the first airbag 20 and the second airbag 22 may be in one housing or may be separate housings. The airbag 20 may be rolled and/or folded to fit within the airbag housing in the uninflated position. The airbag housing may be of any suitable material, e.g., a rigid polymer, a metal, a composite, or a combination of rigid materials.

The airbag, e.g., the first airbag 20 and the second airbag 22, may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 40 is in fluid communication with the airbag, e.g., the first airbag 20 and the second airbag 22. As set forth above, one inflator 40 may inflate the first airbag 20 and the second airbag 22. As another example, the airbag assembly 16 may include two inflators 40, one for the first airbag 20 and the other for the second airbag 22. The inflator 40 expands the airbag 20 with inflation medium, such as a gas, to move the airbag 20 from the uninflated position to the inflated position. The inflator 40 may be supported by any suitable component. For example, the inflator 40 may be supported by the base 18. The inflator 40 may be, for example, a pyrotechnic inflator 40 that ignites a chemical reaction to generate the inflation medium, a stored gas inflator 40 that releases (e.g., by a pyrotechnic valve) stored gas as the inflation medium, or a hybrid. The inflator 40 may be, for example, at least partially in an inflation chamber of the airbag to deliver inflation medium directly to the inflation chamber or may be connected to the inflation chamber through fill tubes, diffusers, etc.

The base 18 of the airbag assembly 16 is disposed at the vehicle-rearward side 24 of the middle console 14. For example, the base 18 may be adjacent to the vehicle-rearward side 24, i.e., with the lack of components therebetween. The base 18 may, for example, abut the vehicle-rearward side 24. The base 18 may be, for example, inside the middle console 14 adjacent the vehicle-rearward side 24, as shown in the example in FIGS. 2-4. As another example, the base 18 may be exterior to the vehicle-rearward side 24, as shown in the example in FIGS. 6-8. In any event, the airbag assembly 16 is vehicle-rearward of the armrest 34 during deployment of the airbag 20 and may be vehicle-rearward of the armrest 34 prior to deployment, e.g., in the recessed shown in FIG. 6 and described further below.

Figure 3:
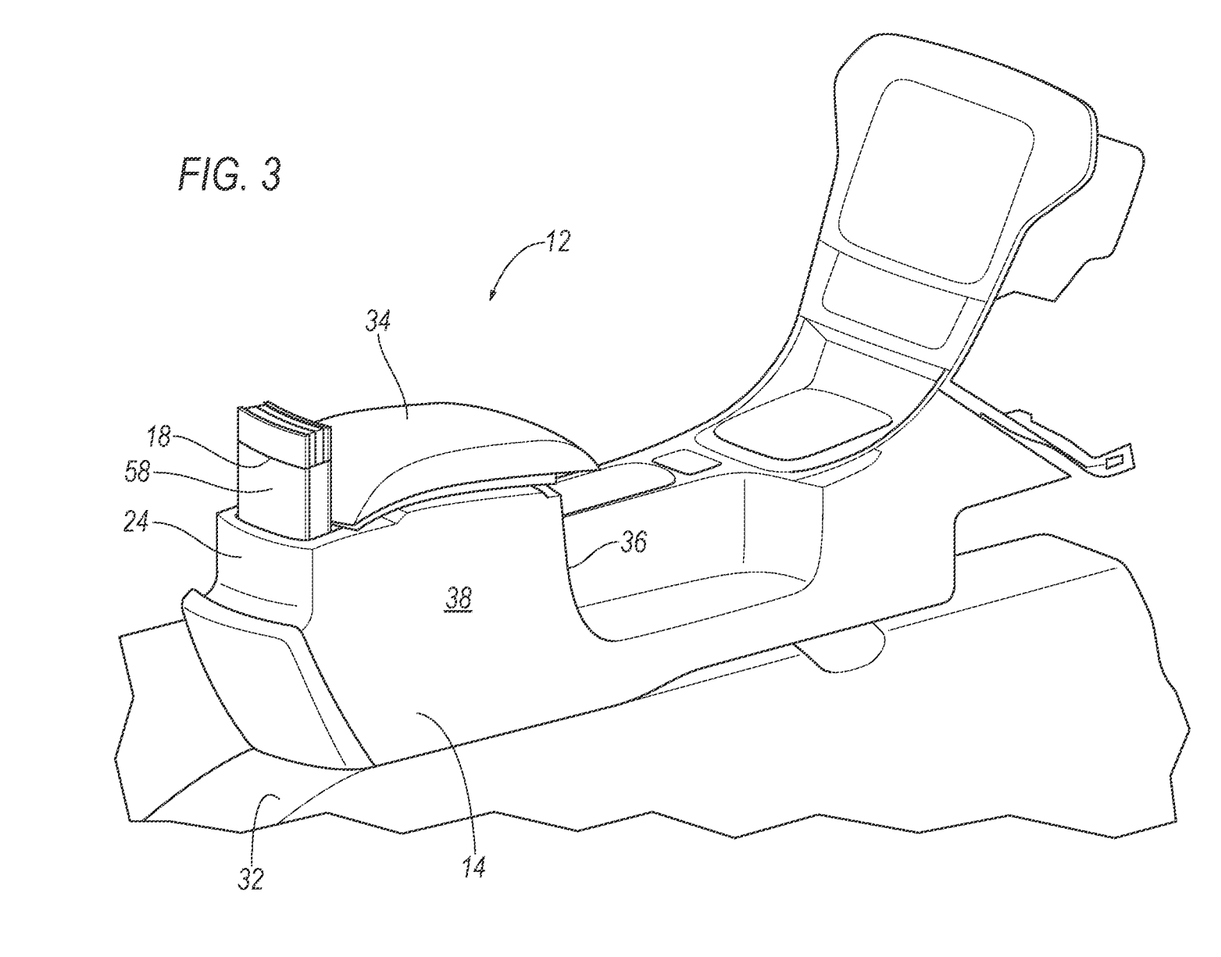
FIG. 3 is a perspective view of the middle console assembly after upward movement of a base of an airbag assembly.
Figure 8:
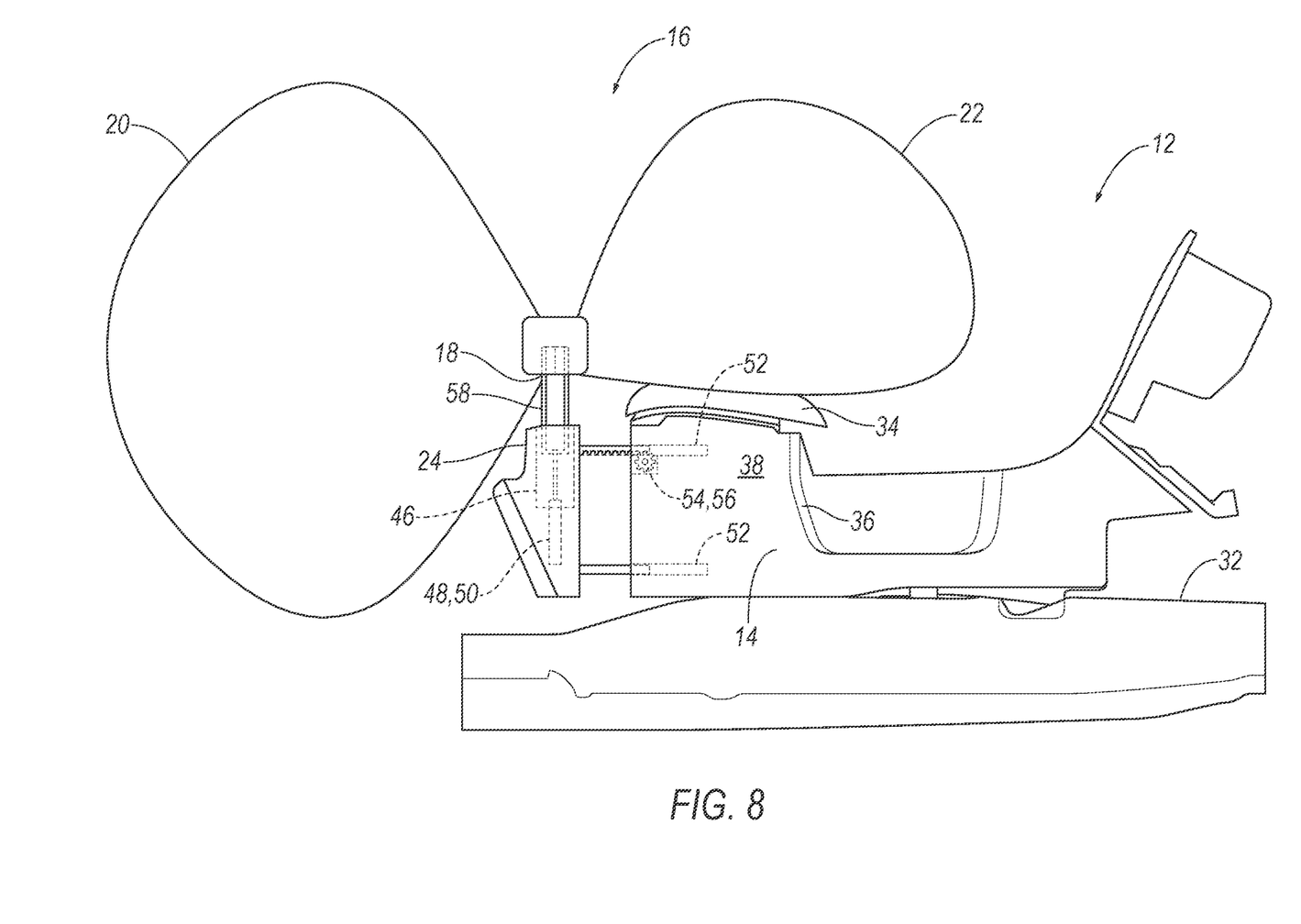
FIG. 8 is a side view of the middle console assembly of FIG. 6 with the two airbags of the airbag assembly inflated.

The base 18 is moveable upwardly relative to the vehicle-rearward side 24 of the middle console 14, as shown in FIG. 3 and FIG. 8. Specifically, the base 18 may be moveable upwardly relative to the vehicle-rearward side 24 of the middle console 14 in response to a detected vehicle impact. The vehicle 10 may include a computer 44 (e.g., a restraints control module) that moves the base 18 upwardly in response to detected vehicle impact, as described further below.

The middle console assembly 12 may include an upward track 46 (shown in FIG. 3) moveably coupling the base 18 of the airbag assembly 16 to the middle console 14. Specifically, the upward track may restrict movement of the base 18 of the airbag assembly 16 to upward movement relative to the middle console 14. As one example, the middle console assembly 12 may include a first linear actuator 48 to move the base 18 upwardly. For example, the first linear actuator 48 may be a pyrotechnic actuator 50 coupled to the base 18 of the airbag 20. In other words, the pyrotechnic actuator 50 moves the base 18 linearly (including examples in which the pyrotechnic actuator 50 operates as a linear pyrotechnic actuator, rotary pyrotechnic actuator, etc.). In such an example, the pyrotechnic actuator 50 may be supported by the middle console 14, as shown in FIG. 3. The pyrotechnic actuator 50 may be in communication with the computer 44 and the computer 44 may instruct the pyrotechnic actuator 50 to activate and move base 18 of the airbag assembly 16 upwardly in response to a detected vehicle impact.

The pyrotechnic actuator 50 includes a pyrotechnic charge. The pyrotechnic charge is activated, e.g., as instructed by the computer 44, to activate the pyrotechnic actuator 50. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

Figure 1:
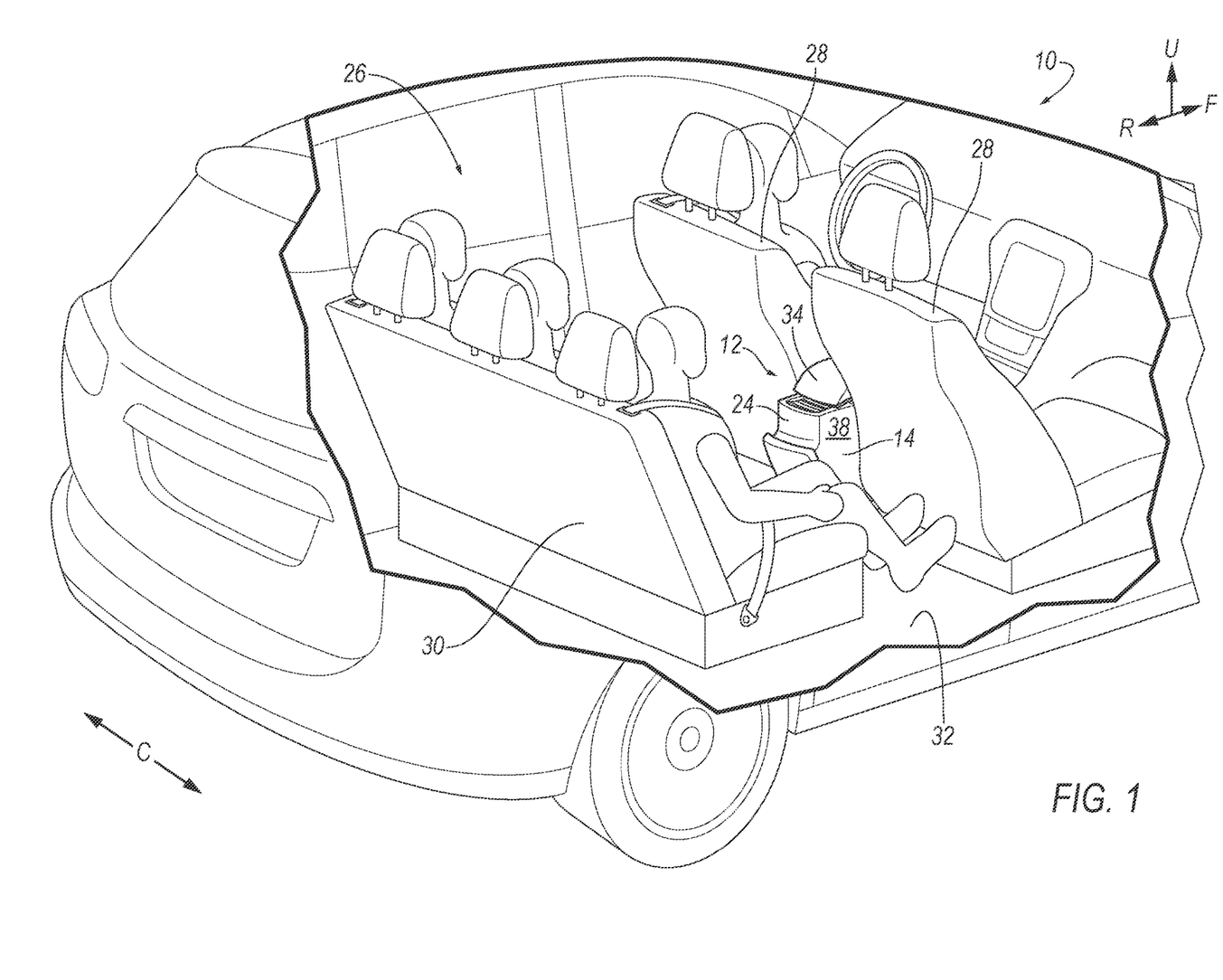
FIG. 1 is a cut-away view of a vehicle including a middle console assembly between two seats.
Figure 2:
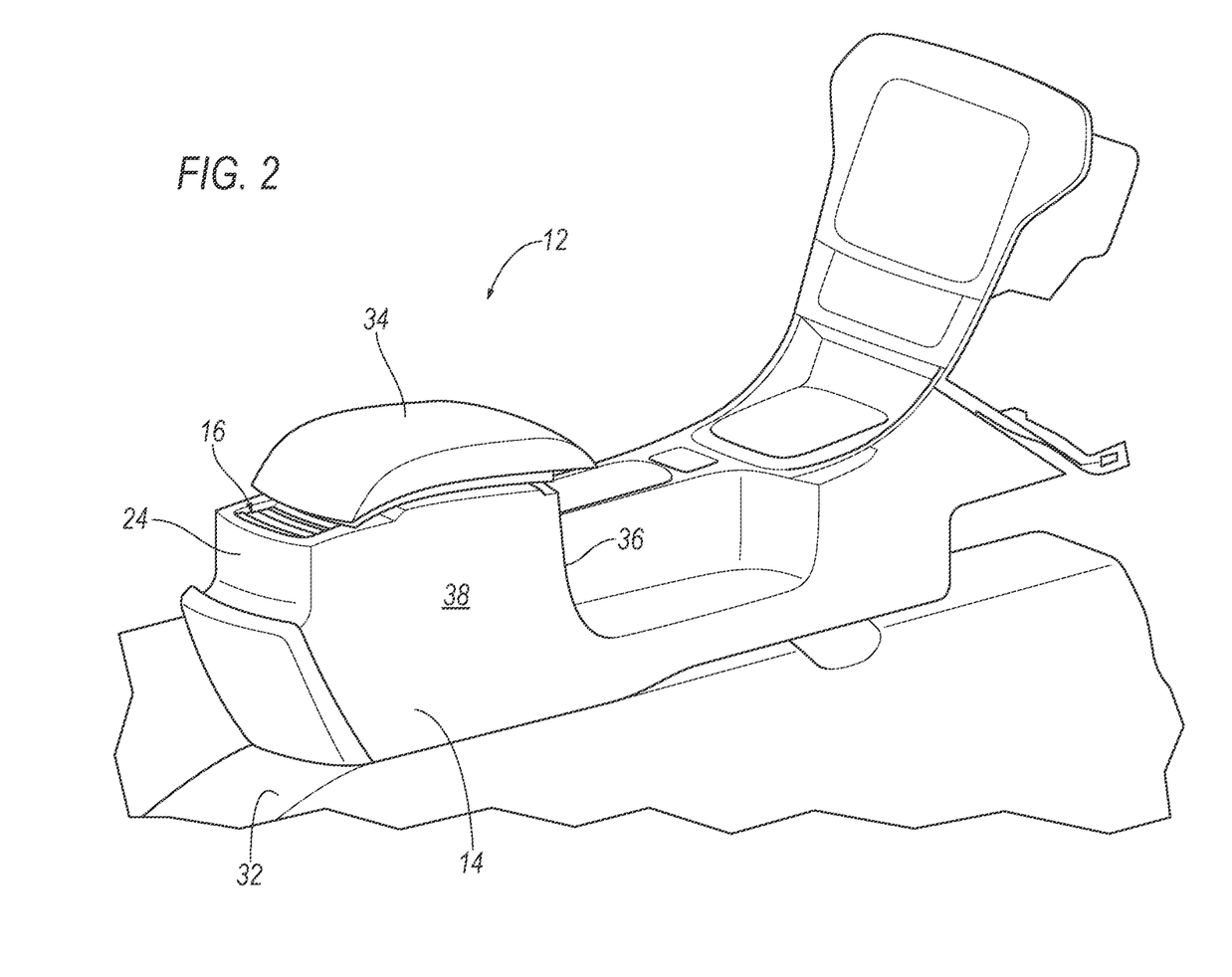
FIG. 2 is a perspective view of the middle console assembly.
Figure 4:
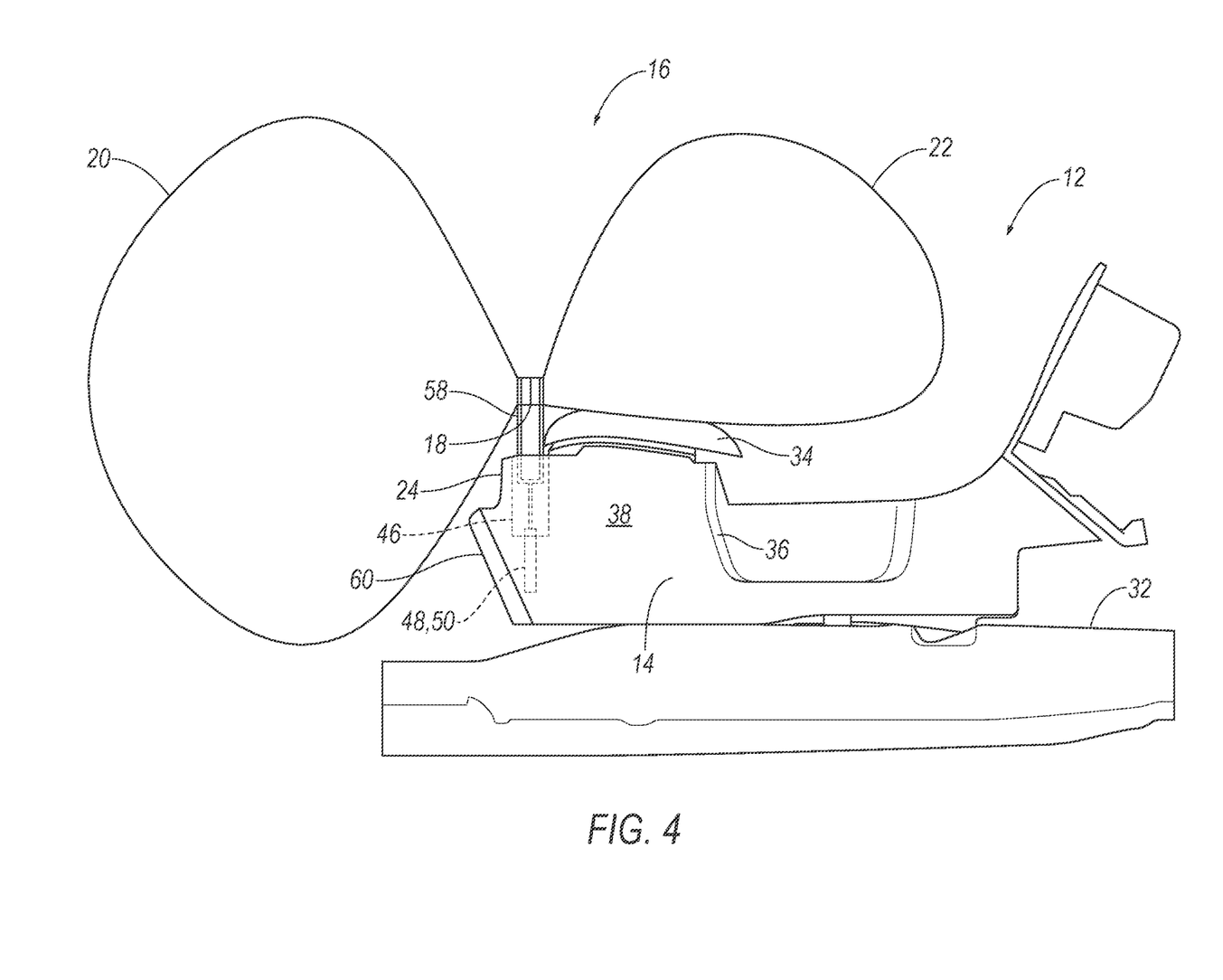
FIG. 4 is a side view of the middle console assembly with two airbags of the airbag assembly inflated.

In the example shown in FIGS. 1-4, the base 18 of the airbag assembly 16 may move upwardly in response to a detected vehicle impact. Specifically, the base 18 and the airbag 20 are recessed in the middle console 14 in a retracted position, as shown in FIGS. 1 and 2, and the base 18 and the airbag 20 are raised relative to the middle console 14 to an extended position in which the base 18 extends externally to the middle console 14, as shown in FIGS. 3 and 4. As shown in FIG. 4, the airbags 20, 22 are inflated when the base 18 is in the extended position. The airbags 20, 22 may be inflated simultaneously with the deployment of the base 18 upwardly, e.g., activation of the pyrotechnic actuator 50, or inflation of the airbag 20 may be delayed, e.g., 10-30 milliseconds, after the activation of the pyrotechnic actuator 50. The computer 44 may instruct the activation of the pyrotechnic actuator 50 and the inflator 40 in response to a detected vehicle impact.

Figure 6:
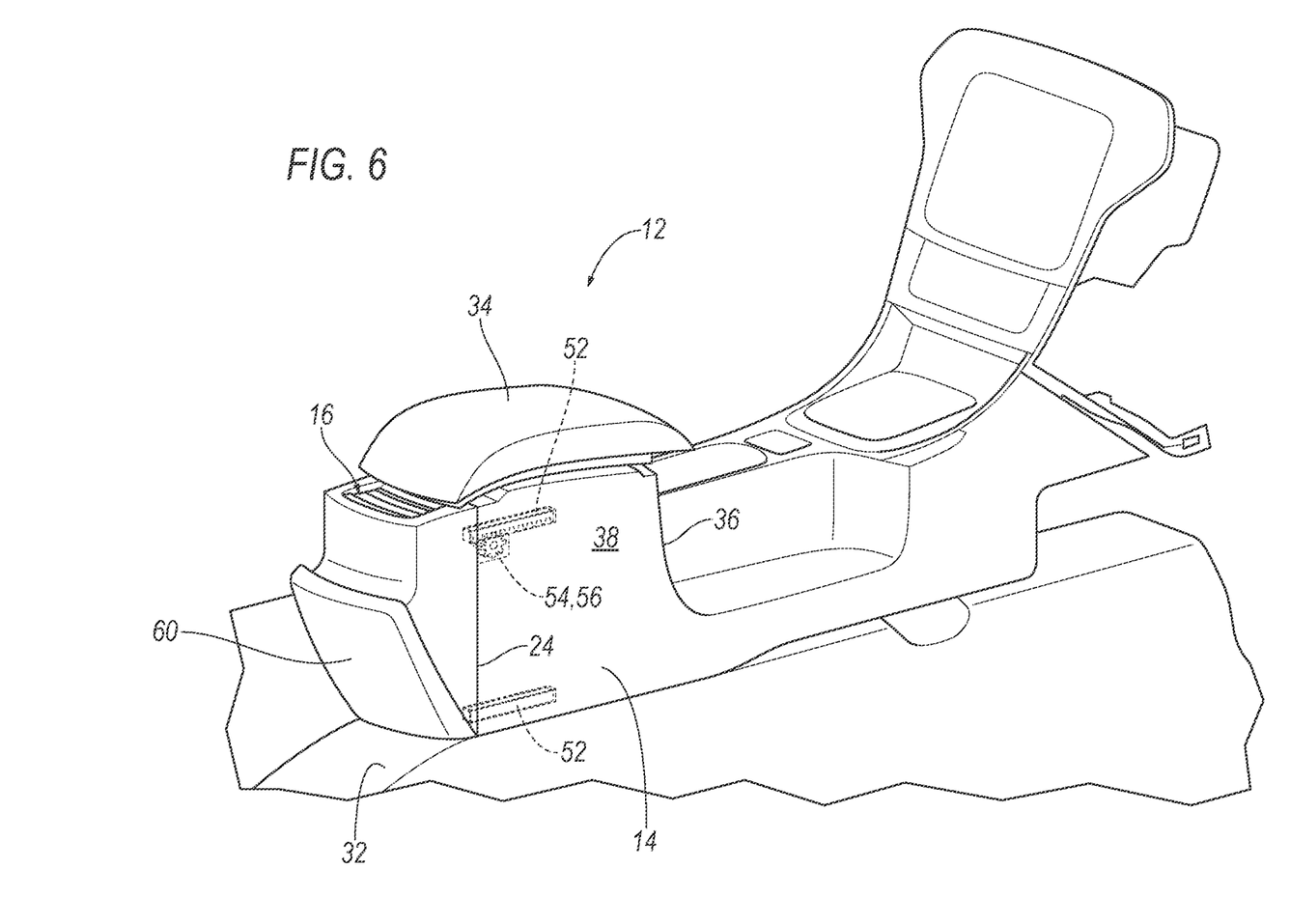
FIG. 6 is a perspective view of another example of the middle console assembly.
Figure 7:
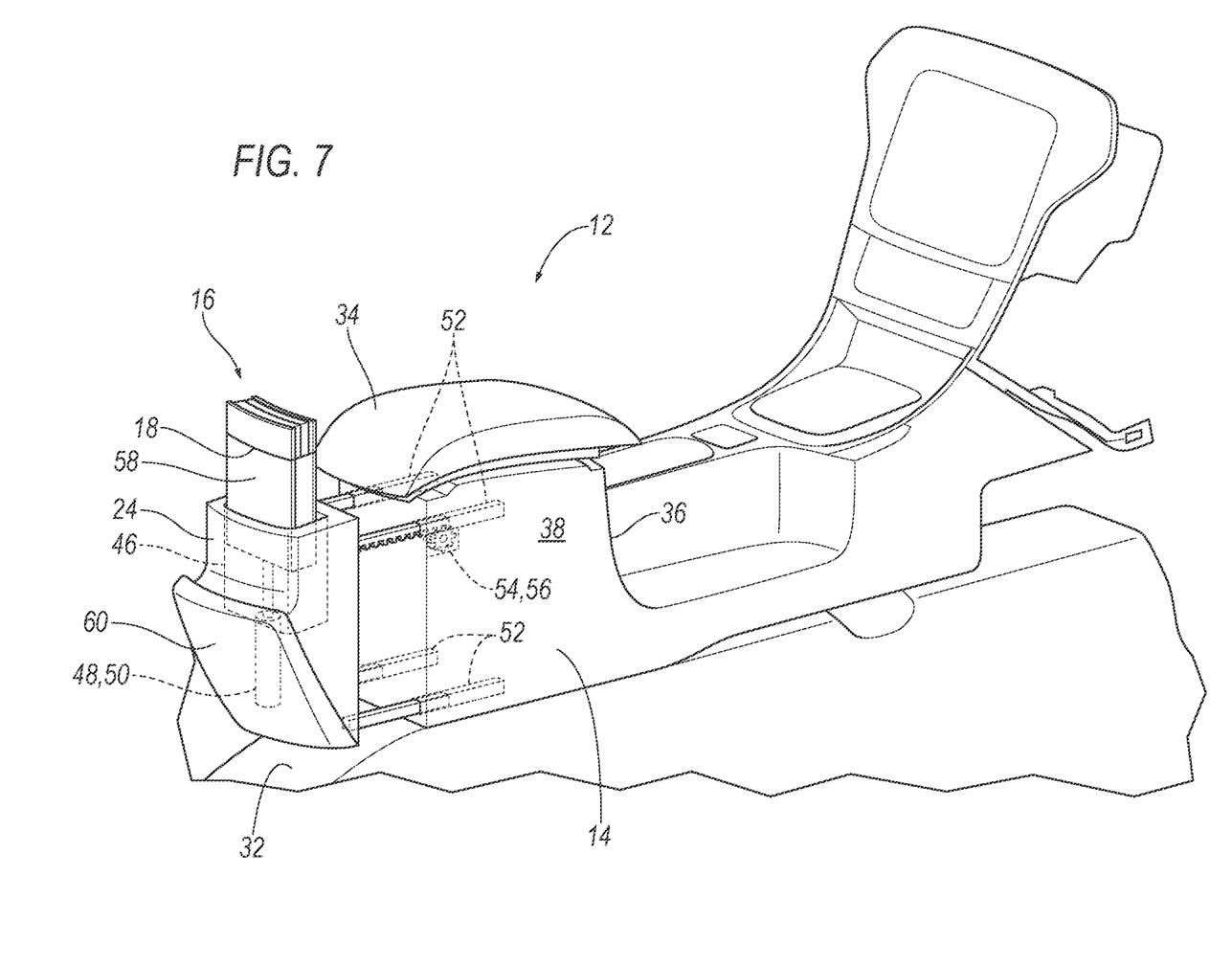
FIG. 7 is a perspective view of the middle console assembly of FIG. 6 after rearward and upward movement of the base of the airbag assembly.

As set forth above, in the example shown in FIGS. 6-8, the base 18 is moveable vehicle-rearward and vehicle-forward relative to the vehicle-rearward side 24 of the middle console 14, as shown in FIGS. 7 and 8. Specifically, the base 18 may be moveable vehicle-rearward and vehicle-forward in response to occupant ingress and egress. The computer 44 moves the base 18 vehicle-forward and vehicle-rearward in response to detected occupant ingress/egress, as described further below.

The middle console assembly 12 may include a rearward track 52 moveably coupling the base 18 of the airbag 20 to the middle console 14. Specifically, the rearward track 52 may restrict movement of the base 18 of the airbag assembly 16 to vehicle-rearward and vehicle-forward movement relative to the middle console 14. As one example, the middle console assembly 12 may include a second linear actuator 54 to move the base 18 vehicle-rearward and vehicle-forward. The second linear actuator 54 is operatively coupled to the base 18 of the airbag assembly 16 to move the base 18 of the airbag assembly 16 vehicle-rearward and vehicle-forward relative to the middle console 14. For example, the second linear actuator 54 include a motor 56 that moves the base 18 vehicle-rearward and vehicle-forward. The motor 56 may drive, for example, a pinion engaged with a rack that moves the base 18. As another example, the motor 56 may drive a lead screw engaged with a carriage that moves the base 18. The motor 56 may be supported by the middle console 14, as shown in FIG. 7. The second linear actuator 54, e.g., the motor 56, may be in communication with the computer 44 and the computer 44 may instruct the motor 56 to move base 18 of the airbag assembly 16 in response to detected occupant ingress/egress.

With reference to FIGS. 6-8, the base 18 includes a first carrier 58 that is moveable vehicle-rearward and vehicle-forward relative to vehicle-rearward side 24 of the middle console 14 and a second carrier 60 that is supported by and moveable upwardly relative to first carrier 58. Specifically, the first carrier 58 is connected to the middle console 14 by the rearward track 52 and the second carrier 60 is connected to the first carrier 58 by the upward track 46. In such an example, the upward track 46 moveably couples the base 18 to the first carrier 58 in the same way that the upward track 46 moveably couples the base 18 to the middle console 14 in the example of FIGS. 1-4 described above and as shown in FIG. 7.

In the example shown in FIGS. 6-8, the base 18 of the airbag assembly 16 may move vehicle-rearward and vehicle-forward in response to detected occupant egress/ingress. For example, the first carrier 58, which supports the second carrier 60, may be moved vehicle-rearward and vehicle-forward by the motor 56. Specifically, the base 18 of the airbag assembly 16 may be vehicle-forward during occupant ingress/egress to provide more room for the occupant to move in the passenger cabin 26. When an occupant is seated in the rear seats 30 and/or the vehicle 10 is driven, e.g., with at least one front seat 28 occupied, the base 18 may be in the vehicle-rearward position to pre-position the airbag assembly 16 for vehicle impact. In the event vehicle impact is detected, the second carrier 60 is moved upwardly and the airbags 20, 22 are inflated, as described above.

The computer 44 may instruct the movement of the base 18 vehicle-rearward and vehicle-forward based on detected occupant ingress/egress to the rear seats 30. Specifically, the vehicle 10 may include occupant sensors 62 that sense the presence of occupants on or near the rear seats 30. The occupant sensors 62 may be, for example, weight sensors in the rear seats 30, cameras in the passenger cabin 26, engagement sensors sensing engagement of a seatbelt clip with a seatbelt buckle, etc., that detect the presence of one or more occupant. Based detection of an occupant entering the passenger cabin 26 at the rear seat 30 and/or sensing new entry of an occupant onto one of the rear seats 30, the computer 44 instructs movement of the base 18 vehicle-forward. When the occupant is seated on the rear seat 30 and the vehicle 10 is driven, the computer 44 instructs movement of the base 18 vehicle-rearward to pre-position the airbag assembly 16. This vehicle-rearward movement may be based on detection that one or more occupants are seated in the rear seat 30, e.g., by image detection, detection of engagement between a seatbelt clip and seatbelt buckle, weight sensing, etc. Based on detection of the occupant exiting the rear seats 30, e.g., image detection detecting movement of the occupant as exiting, detected disengagement of a seatbelt clip with a seatbelt buckle, detected weight change, etc., the computer 44 instructs the movement of the base 18 vehicle-forward to provide additional space for occupant egress.

Figure 9:
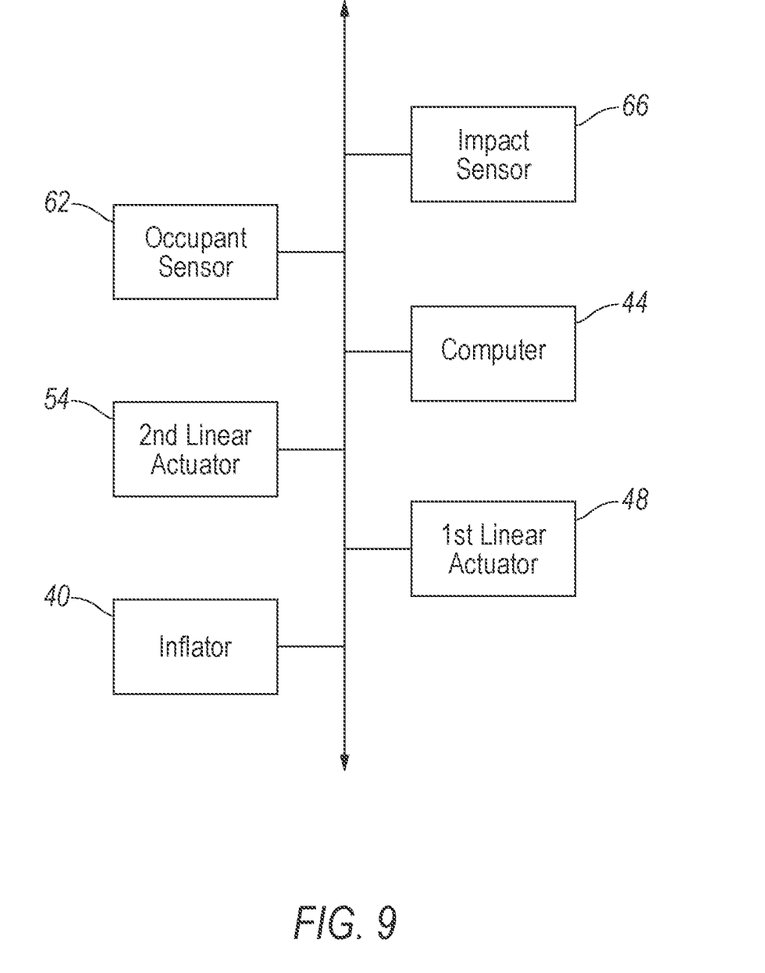
FIG. 9 is a block diagram of a system of the vehicle.

As set forth above, the computer 44 may be a restraints control module. The computer 44 includes a processor and a memory. The memory includes one or more forms of computer 44 readable media, and stores instructions executable by the vehicle 10 computer 44 for performing various operations, including as disclosed herein. For example, the computer 44 can be a generic computer 44 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 44 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 44. The memory can be of any type, e.g., hard disk drives, solid state drives, servers, or any volatile or non-volatile media. The memory can store the collected data sent from the sensors. The memory can be a separate device from the computer 44, and the computer 44 can retrieve information stored by the memory via a network in the vehicle 10, e.g., over a CAN bus, a wireless network, etc. Alternatively or additionally, the memory can be part of the computer 44, e.g., as a memory of the computer 44.

The computer 44 may include or be communicatively coupled to, e.g., via a vehicle 10 network such as a communications bus as described further below, more than one processor, e.g., included in components such as sensors, electronic control units (ECUs) or the like included in the vehicle 10 for monitoring and/or controlling various vehicle 10 components, e.g., a powertrain controller, a brake controller, a steering controller, etc. The computer 44 is generally arranged for communications on a vehicle communication network 64 that can include a bus in the vehicle 10 such as a controller area network CAN or the like, and/or other wired and/or wireless mechanisms. Alternatively or additionally, in cases where the computer 44 actually comprises a plurality of devices, the vehicle communication network 64 may be used for communications between devices represented as the computer 44 in this disclosure. Further, as mentioned below, various controllers and/or sensors may provide data to the computer 44 via the vehicle communication network 64. Description of the computer 44 using the phrases, "in response to," "based on," and "upon determining" indicates a causal relationship, not merely a temporal relationship.

The vehicle 10 may include at least one impact sensor 66 for sensing impact of the vehicle 10. The impact sensor 66 is in communication with the computer 44. The computer 44 may activate the pyrotechnic actuator 50 and the inflator 40 in response to detection of vehicle impact. Alternatively or additionally to sensing impact, the impact sensor 66 may be configured to sense impact prior to impact, i.e., pre impact sensing. The impact sensor 66 may be in communication with the computer 44. The impact sensor 66 is configured to detect an impact to the vehicle 10. The impact sensor 66 may be of any suitable type, for example, post contact sensors such as accelerometers, pressure sensors, and contact switches; and pre impact sensors 66 such as radar, LIDAR, and vision sensing systems. The vision sensing systems may include one or more cameras, CCD image sensors, CMOS image sensors, etc. The impact sensor 66 may be located at numerous points in or on the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A middle console assembly comprising:
   a middle console including a vehicle-rearward side; and
   an airbag assembly including a base and an airbag supported by the base;
   the base of the airbag assembly being disposed at and moveable upwardly relative to the vehicle-rearward side of the middle console.

2. The middle console assembly as set forth in claim 1, further comprising an armrest, the airbag assembly being vehicle-rearward of the armrest.

3. The middle console assembly as set forth in claim 1, further comprising an upward track moveably coupling the base of the airbag to the middle console.

4. The middle console assembly as set forth in claim 1, wherein the airbag is inflatable in a vehicle-forward direction from the base.

5. The middle console assembly as set forth in claim 1, wherein the airbag is inflatable in a vehicle-rearward direction from the base.

6. The middle console assembly as set forth in claim 5, wherein the airbag is elongated in a cross-vehicle direction.

7. The middle console assembly as set forth in claim 5, further comprising a second airbag inflatable in a vehicle-forward direction from the base.

8. The middle console assembly as set forth in claim 1, wherein the base of the airbag assembly is moveable vehicle-rearward relative to the vehicle-rearward side of the middle console.

9. The middle console assembly as set forth in claim 8, further comprising a rearward track moveably coupling the base of the airbag assembly to the middle console.

10. The middle console assembly as set forth in claim 8, further comprising a linear actuator between the middle console and the base of the airbag assembly and operatively coupled to the base of the airbag assembly to move the base of the airbag assembly vehicle-rearward and vehicle-forward relative to the middle console.

11. The middle console assembly as set forth in claim 8, wherein the base includes the first carrier that is moveable vehicle-rearward relative to the vehicle-rearward side of the middle console and a second carrier that is supported by and moveable upwardly relative to the first carrier.

12. The middle console assembly as set forth in claim 11, further comprising a rearward track moveably coupling the first carrier to the middle console and an upward track moveably coupling the second carrier to the first carrier.

13. The middle console assembly as set forth in claim 8, wherein the airbag is inflatable in a vehicle-forward direction from the base.

14. The middle console assembly as set forth in claim 8, wherein the airbag is inflatable in a vehicle-rearward direction from the base.

15. The middle console assembly as set forth in claim 14, wherein the airbag is elongated in a cross-vehicle direction.

16. The middle console assembly as set forth in claim 14, further comprising a second airbag inflatable in a vehicle-forward direction from the base.

17. The middle console assembly of claim 1, wherein the base is moveable relative to the middle console between a retracted position retracted in the middle console and an extended position extended from the middle console.

18. The middle console assembly of claim 1, further comprising a pyrotechnic actuator coupled to the base of the airbag assembly.

* * * * *